(12) United States Patent
Harris et al.

(10) Patent No.: US 11,800,036 B2
(45) Date of Patent: Oct. 24, 2023

(54) DETERMINING MINIMUM SCANNING RESOLUTION

(71) Applicant: Hewlett-Packard Development Company, L.P., Spring, TX (US)

(72) Inventors: Todd J Harris, Boise, ID (US); Peter Bauer, Boise, ID (US); Litao Hu, Boise, ID (US); Jan Allebach, West Lafayette, IN (US); Zhenhua Hu, West Lafayette, IN (US)

(73) Assignee: Hewlett, Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/777,144

(22) PCT Filed: Jan. 23, 2020

(86) PCT No.: PCT/US2020/014776
§ 371 (c)(1),
(2) Date: May 16, 2022

(87) PCT Pub. No.: WO2021/150226
PCT Pub. Date: Jul. 29, 2021

(65) Prior Publication Data
US 2022/0407978 A1 Dec. 22, 2022

(51) Int. Cl.
*H04N 1/04* (2006.01)
(52) U.S. Cl.
CPC ... *H04N 1/0402* (2013.01); *H04N 2201/0458* (2013.01)

(58) Field of Classification Search
CPC .............. H04N 1/0402; H04N 2201/0458
See application file for complete search history.

(56) References Cited

U.S. PATENT DOCUMENTS

| 5,600,574 A | 2/1997 | Reitan |
| 5,867,277 A * | 2/1999 | Melen ............... G06F 16/40 |
| | | 707/E17.022 |

(Continued)

FOREIGN PATENT DOCUMENTS

| EP | 2493170 A1 * | 8/2012 | ........... H04N 1/0402 |
| JP | 2009296533 A * | 12/2009 | ......... H04N 1/00795 |

(Continued)

OTHER PUBLICATIONS

Sindhuri, M.S. et al., "Text Separation in Document Images through Otsu's Method", IEEE WiSPNET 2016 conference, 2395-2399.

(Continued)

*Primary Examiner* — Ted W Barnes
(74) *Attorney, Agent, or Firm* — Brooks, Cameron & Huebsch, PLLC

(57) ABSTRACT

Examples disclosed herein relate to identifying a plurality of content areas of a document to be scanned, classifying each of the plurality of content areas into a content type, determining a minimum scanning resolution to maintain readability for each of the plurality of content areas according to the classified content type, and performing a scan of the document to a digital file, wherein each of the plurality of content areas is scanned at least at the determined minimum scanning resolution to maintain readability of the respective content area.

14 Claims, 4 Drawing Sheets

(56) References Cited

U.S. PATENT DOCUMENTS

| | | | | |
|---|---|---|---|---|
| 5,956,468 | A | * | 9/1999 | Ancin ................ G06V 30/162 358/1.9 |
| 6,014,464 | A | * | 1/2000 | Kurzweil .............. G06V 30/40 382/233 |
| 6,160,249 | A | * | 12/2000 | Webb ................ H04N 1/00795 348/97 |
| 6,377,758 | B1 | | 4/2002 | OuYang et al. |
| 6,587,583 | B1 | * | 7/2003 | Kurzweil .............. H04N 1/644 382/164 |
| 7,010,176 | B2 | * | 3/2006 | Kusunoki ............ H04N 1/0402 358/1.18 |
| 7,376,269 | B2 | | 5/2008 | Klassen et al. |
| 7,672,022 | B1 | * | 3/2010 | Fan ........................ G06T 7/12 358/448 |
| 7,782,339 | B1 | * | 8/2010 | Hobbs ................ H04N 19/187 345/614 |
| 7,783,122 | B2 | | 8/2010 | Wu et al. |
| 8,103,104 | B2 | * | 1/2012 | Fan ..................... G06V 30/413 382/199 |
| 8,208,183 | B2 | | 6/2012 | Wu et al. |
| 8,423,928 | B2 | | 4/2013 | Ghan et al. |
| 8,654,398 | B2 | * | 2/2014 | Dewancker ........ H04N 1/00039 358/1.9 |
| 8,867,796 | B2 | | 10/2014 | Vans et al. |
| 8,913,285 | B1 | * | 12/2014 | Neubrand ............ H04N 1/3873 358/1.9 |
| 8,928,950 | B2 | * | 1/2015 | Kuraya .............. H04N 1/40068 358/448 |
| 9,208,550 | B2 | * | 12/2015 | Chen ..................... G06V 30/40 |
| 9,237,255 | B1 | * | 1/2016 | Gopalkrishnan .. H04N 1/40068 |
| 9,778,206 | B2 | | 10/2017 | Honda et al. |
| 2003/0031363 | A1 | * | 2/2003 | Liu ..................... H04N 1/0402 382/173 |
| 2003/0048487 | A1 | * | 3/2003 | Johnston ............ H04N 1/0402 358/474 |
| 2003/0184776 | A1 | | 10/2003 | Ishizuka |
| 2004/0012815 | A1 | * | 1/2004 | Fuchigami ................ G06T 5/20 382/199 |
| 2004/0223643 | A1 | * | 11/2004 | Irwin ....................... G06T 5/20 382/176 |
| 2005/0062991 | A1 | * | 3/2005 | Fujishige ............ H04N 1/3873 358/1.9 |
| 2005/0163374 | A1 | * | 7/2005 | Ferman .............. H04N 1/40062 382/176 |
| 2007/0064279 | A1 | | 3/2007 | Nishida |
| 2007/0189615 | A1 | * | 8/2007 | Liu ...................... G06V 30/162 382/232 |
| 2008/0310715 | A1 | * | 12/2008 | Simske ............... G06F 18/2321 382/173 |
| 2009/0067005 | A1 | * | 3/2009 | Chelvayohan ....... H04N 1/0408 358/2.1 |
| 2009/0148042 | A1 | * | 6/2009 | Fan .................. G06V 30/19013 382/176 |
| 2009/0201541 | A1 | * | 8/2009 | Neogi ................ H04N 1/00204 358/1.15 |
| 2010/0091312 | A1 | * | 4/2010 | Edwards ............ H04N 1/00779 358/1.13 |
| 2012/0212788 | A1 | * | 8/2012 | Miyazaki .............. H04N 1/0443 358/474 |
| 2012/0250101 | A1 | * | 10/2012 | Kuraya .............. H04N 1/40068 358/448 |
| 2014/0184852 | A1 | | 7/2014 | Niemi |
| 2016/0004921 | A1 | * | 1/2016 | McCarthy ............ G06V 20/635 382/173 |
| 2016/0210523 | A1 | * | 7/2016 | Abdollahian .......... G06V 30/40 |
| 2018/0295355 | A1 | | 10/2018 | Flanagan et al. |
| 2019/0213434 | A1 | | 7/2019 | Zamfir et al. |
| 2019/0228222 | A1 | | 7/2019 | Nepomniachtchi et al. |
| 2022/0311872 | A1 | | 9/2022 | Kikuta et al. |

FOREIGN PATENT DOCUMENTS

| | | | |
|---|---|---|---|
| JP | 2010056827 | A * | 3/2010 |
| JP | 2016060190 | A | 4/2016 |
| KR | 20140063378 | A | 5/2014 |
| WO | WO-2007146400 | A2 | 12/2007 |
| WO | WO-2019172918 | A1 | 9/2019 |
| WO | 2021/150231 | A1 | 7/2021 |
| WO | 2022/154787 | A1 | 7/2022 |

OTHER PUBLICATIONS

Xiao, Z. et al., "Digital Image Segmentation for Object-Oriented Halftoning", IS&T International Symposium on Electronic Imaging 2016, 7 pp.

* cited by examiner

100

[6pts] Maecenas sit amet sem v
erat et, pharetra volutpat augue
quis, cursus tortor. Etiam elit nul

[6pts] Maecenas sit amet sem v
erat et, pharetra volutpat augue
quis, cursus tortor. Etiam elit nul

[6pts] Maecenas sit amet sem v
erat et, pharetra volutpat augue
quis, cursus tortor. Etiam elit nul

DETERMINING MINIMUM SCANNING RESOLUTION

BACKGROUND

A document, such as a scanned document, may include a plurality of words, phrases, objects and/or symbols. Additionally, various actions may be performed on the document. The document may be analyzed such that specific words, phrases, objects and/or symbols may be identified.

BRIEF DESCRIPTION OF THE DRAWINGS

FIGS. 1A-1D illustrate a set of examples of a text area scanned at different resolutions.

Figure 2:
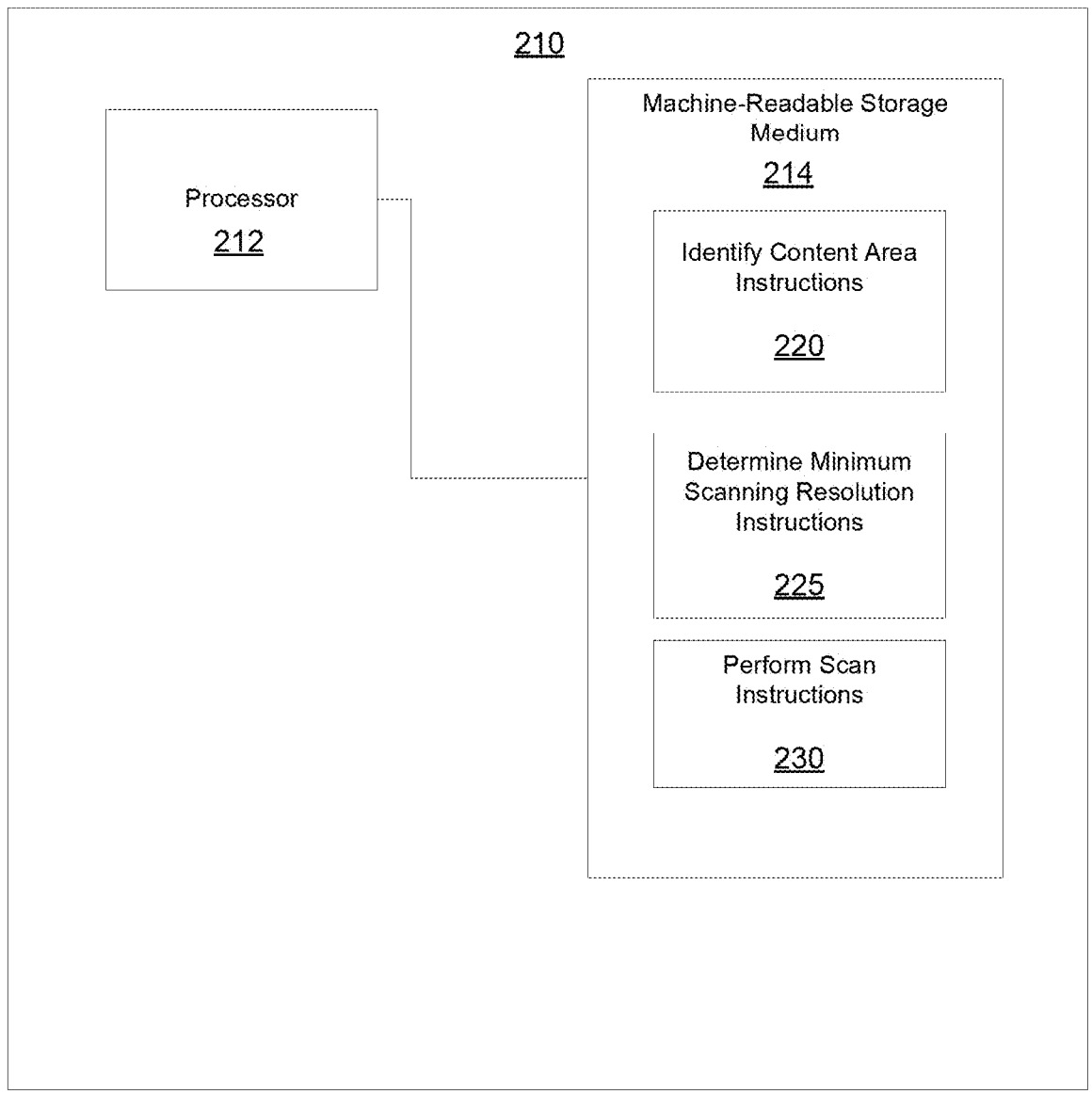
FIG. 2 is a block diagram of an example computing device for determining minimum scanning resolution.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most printers, scanners, cameras, and/or multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

Such devices may interact with a document in numerous ways, such as printing, copying, scanning, faxing, etc. Such a document may include a plurality of sections for user input and/or user action. For instance, a document may include an object or a plurality of objects indicating a location for a signature, a location for an initial, and/or a location for other user input, images, charts, schematics, and/or background colors and/or patterns, among other examples.

In some circumstances, a scanner uses a predefined scan resolution, whether user-selected or default in a scanner's settings. Once the scanning process begins, the resolution cannot be changed, resulting in all scanned pages, no matter how much their contents may vary, having output images of the same size and resolution. For example, if one page has a large area of empty space, the empty space may have the same resolution as a text or drawing area where a higher resolution is needed to preserve the details. This sometimes results in memory waste, since the empty area doesn't need to preserve that high resolution.

In some implementations consistent with this disclosure, different scan resolutions for different contents in a digital image file may be decided. Higher scan resolutions may keep more details and yield higher-quality images while the quality of scanned images degrades with a lower scan resolution. By segmenting a scanned image into regions of interest, a minimum scanning resolution for each region may be determined, and the resulting file size of the scanned image may be optimized. Consistent with implementations described herein, scanning may refer to an original capture of a document file, such as via an optical scanner and/or camera, and/or rescanning, in a memory of a computing device, of an existing digital file.

As a first stage, a document may be scanned at a fixed resolution prior to segmentation. This initial scanned image may be used to calculate features for each pixel, forming a plurality of feature maps, each corresponding to one particular feature, such as average gray-scale image, average gradient, and/or average saturation. An average gray-scale image may comprise a gaussian weighted average of all pixel values in a 5×5 window in a converted gray-scale version of the input image, such as by applying a 5×5 Gaussian filter to the gray-scale image obtained from the original color input image. An average gradient may comprise a gaussian weighted average of the absolute value of difference between every pair of neighboring pixels in a 5×5 window of the gray-scale image. An average saturation feature may comprise, for each pixel in a 5×5 window, a calculation of the saturation values in the hue, saturation, value (HSV) and/or hue, saturation, lightness (HSL) color system.

These feature maps may be converted into masks in order to classify pixels of the input image into content areas, such as text, non-text, and/or background areas. Bounding boxes may be drawn around pixels of the same content area type for processing and scanning into a final file at optimal resolutions.

In some implementations, an average gray-scale image may be an effective feature map for differentiation background areas in a scanned document, as dark-color pixels can be a good indication for main content or non-background pixels. Since a raw scanned image can suffer from scattered noise pixels, the 5×5 Gaussian filter may be applied to the gray-scale image in order to remove noise.

In some implementations, the gradient for a pixel may be calculated as the average absolute value of differences between that pixel and its direct neighbors. Average gradient then means the Gaussian weighted average of all the gradients inside a window (e.g., a 5×5 pixel area). Average gradient may have a greater value in a window where pixel values are alternating, which is often the case in text areas. Therefore, greater feature values will be seen in text windows while smaller feature values will be seen in background areas or areas of solid color.

In some implementations, achromatic colors will have small saturation values. As a result, gray and/or black pixels may have a small saturation. On the other hand, for a chromatic color pixel, their saturation values may be greater. Therefore, because text pixels are usually gray and/or black, a greater saturation often indicates pixels in a non-text area.

Once the pixels are classified by content area, pixels of the same content type may be grouped together within bounding boxes. These bounded areas may then be analyzed to determine the minimum scanning resolution at which readability and/or clarity may be maintained. Readability may be considered as the ability for a human to read the scanned image without difficulty and/or for a machine to accurately read the scanned image, such as via optical character recognition (OCR). For a non-text area such as an image, readability may be considered as preserving details of the image contents without introducing undue interference or other blurriness.

FIGS. 1A-1D illustrate a set of examples of a text area scanned at different resolutions. In some implementations, each area may be evaluated at a multiple of a base resolution. For example, a scanner's base resolution may comprise 75 dots-per-inch (DPI), while a default resolution may comprise 600 DPI. Each bounding area may be evaluated at a fixed and/or fractional multiple of a base resolution until the default resolution is reached (and/or higher multiples in some implementations), such as 150 DPI (75×2), 300 DPI (75×4), and 600 DPI (75×8).

FIG. 1A illustrates an example text area 110 scanned at 600 DPI.

FIG. 1B illustrates an example text area 120 scanned at 300 DPI.

FIG. 1C illustrates an example text area 130 scanned at 150 DPI.

FIG. 1D illustrates an example text area 140 scanned at 75 DPI.

Once the content areas have been scanned at different resolutions, whether by performing an optical scan of a document at different resolutions and/or resampling an image at different resolutions, the images at two resolutions may be compared to evaluate differences between them. In some implementations, differences that affect readability may comprise merging pixels, breaking pixels, and/or filling pixels. Merging pixels may comprise pixels on different strokes that become connected or overlapped with each other as resolution decreases. Breaking pixels may comprise pixels on the same stroke of a glyph that disappear and result in a breaking stroke as resolution decreases. Filling pixels may comprise pixels that emerge and fill holes (e.g., background regions surrounded by foreground pixels) as resolution decreases. The numbers of the various kinds of differentiating pixels may be counted and used as a measure of degraded readability at lower resolutions. Once the measure reaches a threshold value, a determination may be made that the corresponding resolution is below the minimum to maintain readability and the next highest resolution may be determined to be the minimum scanning resolution. In some implementations, a machine-learning trained support vector machine (SVM) may be used to evaluate the comparisons between resolutions.

FIG. 2 is a block diagram of an example computing device 210 for determining minimum scanning resolution. Computing device 210 may comprise a processor 212 and a non-transitory, machine-readable storage medium 214. Storage medium 214 may comprise a plurality of processor-executable instructions, such as identify content area instructions 220, determine minimum scanning resolution instructions 225, and perform scan instructions 230. In some implementations, instructions 220, 225, 230 may be associated with a single computing device 210 and/or may be communicatively coupled among different computing devices such as via a direct connection, bus, or network.

Processor 212 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 214. In particular, processor 212 may fetch, decode, and execute instructions 220, 225, 230.

Executable instructions 220, 225, 230 may comprise logic stored in any portion and/or component of machine-readable storage medium 214 and executable by processor 212. The machine-readable storage medium 214 may comprise both volatile and/or nonvolatile memory and data storage components. Volatile components are those that do not retain data values upon loss of power. Nonvolatile components are those that retain data upon a loss of power.

The machine-readable storage medium 214 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Identify content area instructions 220 may identify a plurality of content areas of a document to be scanned.

Determine minimum scanning resolution instructions 225 may, for each of the plurality of content areas, determine a minimum scanning resolution to maintain readability.

In some implementations, the instructions 225 to identify the plurality of content areas of the document to be scanned may comprise instructions to classify each of the plurality of content areas as at least one of the following: a text and/or symbol area, a non-text and/or raster area, and a background and/or vector area. The instructions to classify each of the plurality of content area may comprise instructions to extract a feature vector for each pixel of the document to be scanned such as by calculating an average feature vector for a window centered on each of a plurality of pixels associated with the document to be scanned. For example, the average feature vector may comprise at least one of the following: an averaged gray-scale value, an average gradient value, and an average saturation value.

In some implementations, instructions 225 to identify the plurality of content areas of the document to be scanned may comprise instructions to apply a bounding mask to each of the plurality of content areas. For example, the instructions to determine the minimum scanning resolution to maintain readability comprise instructions to digitally scan at least one of the plurality of content areas at a plurality of resolutions and determine the lowest of the plurality of resolutions that maintains readability. In some implementations, the instructions to determine the minimum scanning resolution to maintain readability may comprise instructions to evaluate at least one interaction between pixels in the at least one of the plurality of content areas, such as a number of merging pixels, breaking pixels, and/or filling pixels.

Perform scan instructions 230 may, perform a scan of the document to a digital file, wherein each of the plurality of content areas is scanned at least at the determined minimum scanning resolution to maintain readability of the respective content area.

Figure 3:
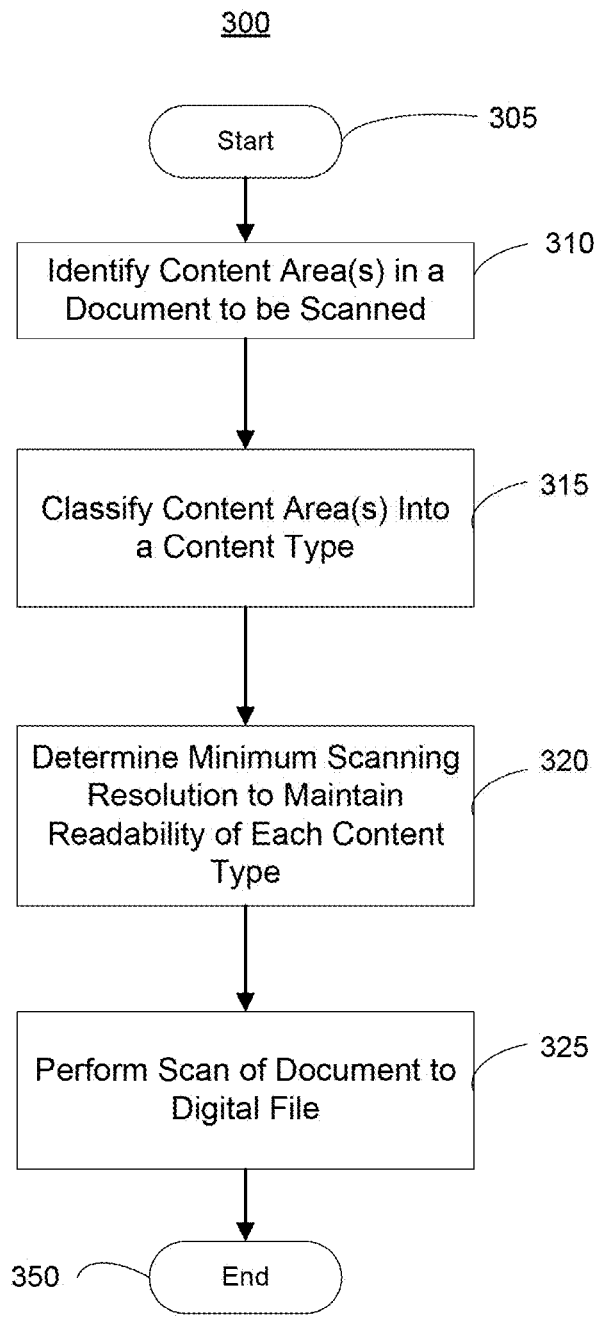
FIG. 3 is a flowchart of an example method for determining minimum scanning resolution.

FIG. 3 is a flowchart of an example method 300 for consumable characteristic identification. Although execution of method 300 is described below with reference to computing device 210, other suitable components for execution of method 300 may be used.

Method 300 may begin at stage 305 and advance to stage 310 where device 210 may identify a plurality of content areas of a document to be scanned.

Method 300 may then advance to stage 315 where computing device 210 may classify each of the plurality of content areas into a content type. For example, the content type may comprise at least one of the following: a text area, a non-text area, and a background area.

Method 300 may then advance to stage 320 where computing device 210 may determine a minimum scanning resolution to maintain readability for each of the plurality of content areas according to the classified content type. In some implementations, determining the minimum scanning resolution to maintain readability for each of the plurality of content areas may comprises comparing at least one interaction between pixels at different scanning resolutions in the at least one of the plurality of content areas. Such an interaction between pixels may comprise, for example, a merging pixel, a breaking pixel, and a filling pixel. For example, computing device 210 may determine whether a number of breaking pixels within a content area at one resolution (e.g., 150 DPI) is over a threshold amount that indicates loss of readability relative to the same content area is a higher resolution (e.g., 300 DPI).

In some implementations, comparing the at least one interaction between pixels at different scanning resolutions in the at least one of the plurality of content areas comprises, for a non-text area, may comprise calculating a tiled structural similarity index. Calculating a structural similarity index (SSIM) may comprise extracting feature vectors from the scanned area at different resolutions. Such feature vectors may comprise, for example, luminance, contrast, structure, etc. To accurately compare two images at different resolutions, tiles of differing pixel areas may be used across each image, such as using a 12×12 pixel tile for images scanned at 300 DPI, using a 8×8 pixel tile for images scanned at 200 DPI, using a 6×6 pixel tile for images scanned at 150 DPI, using a 4×4 pixel tile for images scanned at 100 DPI, and/or using a 3×3 pixel tile for images scanned at 75 DPI. Other tile sizes and scanning resolutions may be contemplated and used, consistent with implementations described herein. In some implementations, maximum and minimum grayscale values may comprise features extracted for each tile and/or a standard deviation between greyscale values within the pixels of a tile may be extracted. A mean and/or standard deviation between corresponding tiles at different resolutions may then be used to calculate the similarity index.

Once the tiles have been generated for each resolution, a number of horizontal and/or vertical transitions—changes between foreground text, imagery, background, and/or edge pixels—may be calculated for each set of corresponding tiles and/or across the entire page. The average change between the number of horizontal and/or vertical transitions across corresponding tiles in different scanning resolutions may be calculated, and if that average exceeds a threshold value, the content area may be deemed unreadable at the lower resolution value. In some implementations, a machine-learning trained support vector machine (SVM) may be used to evaluate the comparisons between resolutions and/or SSIMs.

Method 300 may then advance to stage 325 where computing device 210 may perform a scan of the document to a digital file, wherein each of the plurality of content areas is scanned at least at the determined minimum scanning resolution to maintain readability of the respective content area. For example, a document may be scanned to an image scanner with text-based content areas at 300 DPI, non-text content areas at 150 DPI, and background areas at 75 DPI. In some implementations, different content areas of the same type may be scanned and/or resampled at different resolutions, such as having some text-based content areas scanned at 300 DPI while other text-based content areas may be scanned at 150 DPI.

Method 300 may then end at stage 350.

Figure 4:
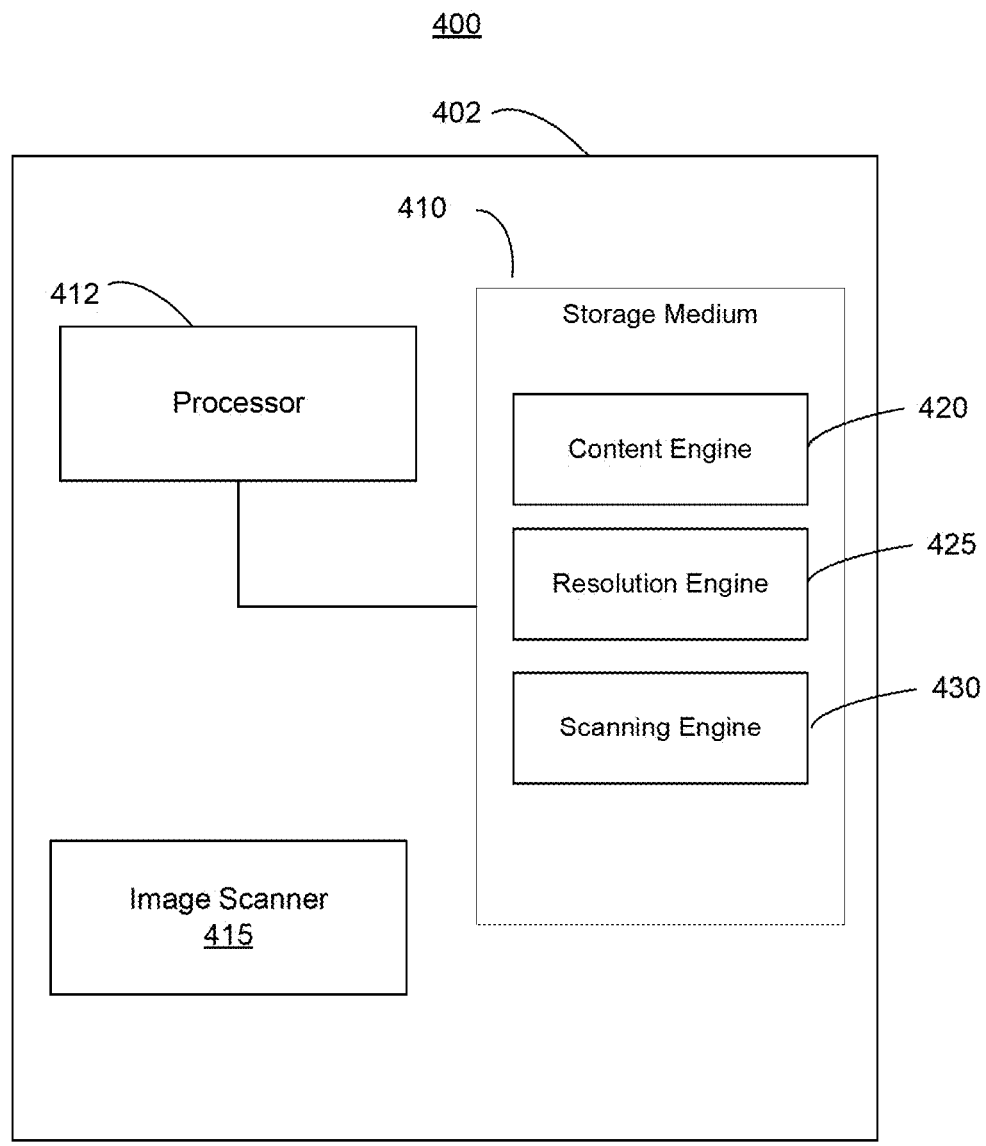
FIG. 4 is a block diagram of an example system for determining minimum scanning resolution.

FIG. 4 is a block diagram of an example apparatus 400 for determining minimum scanning resolution. Apparatus 400 may comprise a multi-function printer device 402 comprising a storage medium 410, a processor 412, and an image scanner 415. Device 402 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 402 may store, in storage medium 410, a content engine 420, a resolution engine 425, and a scanning engine 430. Image scanner 415 may comprise a device and/or component that optically scans images, printed text, handwriting or an object and converts it to a digital image via capture of reflected light by an image sensor. Image scanner 415 may comprise, for example, a photomultiplier tube, a charge-coupled device (CCD), and/or a contact image sensor (CIS) as an image sensor.

Each of engines 420, 425, 430 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325. In such examples, device 302 may comprise the machine-readable storage medium storing the instructions and the processing resource to execute the instructions, or the machine-readable storage medium may be separate but accessible to apparatus 300 and the processing resource.

Content engine 420 may extract a plurality of features from a document to be scanned and identify a plurality of content areas in the document according to the extracted plurality of features.

Resolution engine 425 may determine a minimum scanning resolution to maintain readability for each of the plurality of content areas.

Scanning engine 430 may perform a scan of the document to a digital file, wherein each of the plurality of content areas is scanned at least at the determined minimum scanning resolution to maintain readability of the respective content area.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed is:

1. A non-transitory machine readable medium storing instructions executable by a processor to:

identify a plurality of content areas of a document to be scanned;

for each of the plurality of content areas, determine a minimum scanning resolution to maintain readability based on an evaluation of a merging pixel interaction between pixels of the plurality of content areas that comprise a text area; and perform a scan of the document to a digital file, wherein each of the plurality of content areas is scanned at least at the determined minimum scanning resolution to maintain readability of the respective content area.

2. The non-transitory machine readable medium of claim 1, wherein the instructions to identify the plurality of content areas of the document to be scanned comprise instructions to classify each of the plurality of content areas as at least one of the following: a text area, a non-text area, and a background area.

3. The non-transitory machine readable medium of claim 2, wherein the instructions to classify each of the plurality of content area comprise instructions to extract a feature vector for each pixel of the document to be scanned.

4. The non-transitory machine readable medium of claim 3, wherein the instructions to extract the feature vector for each pixel of the document to be scanned comprise instructions to calculate an average feature vector for a window centered on each of a plurality of pixels associated with the document to be scanned.

5. The non-transitory machine readable medium of claim 4, wherein the average feature vector comprises at least one of the following: an averaged gray-scale value, an average gradient value, and an average saturation value.

6. The non-transitory machine readable medium of claim 1, wherein the instructions to identify the plurality of content areas of the document to be scanned comprise instructions to apply a bounding mask to each of the plurality of content areas.

7. The non-transitory machine readable medium of claim 1, wherein the instructions to determine the minimum scanning resolution to maintain readability comprise instructions to:

digitally scan at least one of the plurality of content areas at a plurality of resolutions; and determine the lowest of the plurality of resolutions that maintains readability.

8. The non-transitory machine readable medium of claim 7, wherein the plurality of resolutions comprise multiples of a base resolution.

9. The non-transitory machine readable medium of claim 7, wherein the instructions to determine the minimum scanning resolution to maintain readability comprise instructions to evaluate at least one interaction between pixels in the at least one of the plurality of content areas.

10. A method comprising:

identifying a plurality of content areas of a document to be scanned;

classifying each of the plurality of content areas into a content type;

determining a minimum scanning resolution to maintain readability for each of the plurality of content areas according to the classified content type based on an evaluation of a breaking pixel interaction between pixels of the plurality of content areas that comprise a text area; and performing a scan of the document to a digital file, wherein each of the plurality of content areas is scanned at least at the determined minimum scanning resolution to maintain readability of the respective content area.

11. The method of claim 10, wherein the content type comprises at least one of the following: a text area, a non-text area, and a background area.

12. The method of claim 11, wherein determining the minimum scanning resolution to maintain readability for each of the plurality of content areas comprises comparing at least one interaction between pixels at different scanning resolutions in the at least one of the plurality of content areas.

13. The method of claim 12, wherein comparing the at least one interaction between pixels at different scanning resolutions in the at least one of the plurality of content areas comprises, for a non-text area, calculating at least one of the following: a tiled structural similarity index, a horizontal transition value, and a vertical transition value.

14. A system, comprising:

a content engine to:
  extract a plurality of features from a document to be scanned, and
  identify a plurality of content areas in the document according to the extracted plurality of features;

a resolution engine to:
  determine a minimum scanning resolution to maintain readability for each of the plurality of content areas based on an evaluation of a filling pixel interaction between pixels of the plurality of content areas that comprise a text area; and a scanning engine to:
  perform a scan of the document to a digital file, wherein each of the plurality of content areas is scanned at least at the determined minimum scanning resolution to maintain readability of the respective content area.

\* \* \* \* \*